United States Patent
Okamura

(10) Patent No.: US 8,164,282 B2
(45) Date of Patent: Apr. 24, 2012

(54) MOTIVE POWER OUTPUT APPARATUS AND VEHICLE WITH THE SAME

(75) Inventor: Masaki Okamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 682 days.

(21) Appl. No.: 12/226,035

(22) PCT Filed: May 22, 2007

(86) PCT No.: PCT/JP2007/060763
§ 371 (c)(1),
(2), (4) Date: Oct. 6, 2008

(87) PCT Pub. No.: WO2007/139045
PCT Pub. Date: Dec. 6, 2007

(65) Prior Publication Data
US 2009/0173555 A1 Jul. 9, 2009

(30) Foreign Application Priority Data

May 30, 2006 (JP) ................................. 2006-150118

(51) Int. Cl.
*B60W 10/08* (2006.01)
*B60W 20/00* (2006.01)
(52) U.S. Cl. ............ 318/139; 318/255; 701/22; 701/43; 180/65.265
(58) Field of Classification Search .................. 318/759, 318/760, 375, 376, 139, 34, 255; 180/65.265, 180/65.275, 65.21; 363/71, 95; 701/22
See application file for complete search history.

(56) References Cited

U.S. PATENT DOCUMENTS 5,365,153 A 11/1994 Fujita et al.
(Continued)

FOREIGN PATENT DOCUMENTS

JP A-6-86596 3/1994
(Continued)

OTHER PUBLICATIONS

Decision to Grant Patent for priority Japanese Patent Application No. 2006-150118, mailed on Apr. 12, 2011 (w/ English translation).

*Primary Examiner* — Eduardo Santana
(74) *Attorney, Agent, or Firm* — Oliff & Berridge, PLC

(57) ABSTRACT

An object of the present invention is to provide a motive power output apparatus including a motor with a permanent magnet and a motor without a permanent magnet. A boost device (10) is connected to a power storage device (B). A first drive device (30) is connected to the boost device (10). A first rotating electric machine (35) with a permanent magnet is connected to the first drive device (30). A second drive device (40) is connected to the power storage device (B). A second rotating electric machine (45) without a permanent magnet is connected to the second drive device (40). A third drive device (20) is connected in parallel to the first drive device (30). A third rotating electric machine (25) with a permanent magnet is connected to the third drive device (20). The second rotating electric machine (45) is formed of a reluctance motor or an induction motor. The first rotating electric machine (35) and the second rotating electric machine (45) of the present invention may be linked to wheels of a vehicle.

15 Claims, 6 Drawing Sheets

U.S. PATENT DOCUMENTS

| | | | | |
|---|---|---|---|---|
| 5,586,613 | A * | 12/1996 | Ehsani | 180/65.23 |
| 5,939,794 | A * | 8/1999 | Sakai et al. | 290/40 A |
| 7,257,475 | B2 * | 8/2007 | Asaumi et al. | 701/43 |
| 7,597,164 | B2 * | 10/2009 | Severinsky et al. | 180/65.27 |
| 7,950,481 | B2 * | 5/2011 | Betz et al. | 180/65.31 |
| 2004/0050597 | A1 * | 3/2004 | Ai et al. | 180/65.2 |
| 2006/0114702 | A1 * | 6/2006 | Yamada et al. | 363/132 |
| 2007/0158948 | A1 * | 7/2007 | Oyobe et al. | 290/4 R |
| 2007/0165432 | A1 * | 7/2007 | Okamura et al. | 363/132 |
| 2009/0088914 | A1 | 4/2009 | Mizutani et al. | |
| 2009/0108794 | A1 * | 4/2009 | Ochiai et al. | 318/760 |
| 2009/0159350 | A1 * | 6/2009 | Hanada et al. | 180/65.265 |
| 2009/0167234 | A1 * | 7/2009 | Uechi | 318/800 |
| 2010/0117570 | A1 * | 5/2010 | Nishimori et al. | 318/400.3 |
| 2010/0242481 | A1 * | 9/2010 | Shamoto et al. | 60/698 |

FOREIGN PATENT DOCUMENTS

| | | |
|---|---|---|
| JP | A-7-67216 | 3/1995 |
| JP | A-2004-96835 | 3/2004 |
| JP | A-2004-242371 | 8/2004 |
| JP | A-2004-260904 | 9/2004 |
| JP | A-2004-328991 | 11/2004 |
| JP | A-2005-20952 | 1/2005 |
| JP | A-2005-130670 | 5/2005 |
| JP | A-2005-151685 | 6/2005 |
| JP | A-2006-54937 | 2/2006 |
| JP | A-2007-313982 | 12/2007 |

* cited by examiner

MOTIVE POWER OUTPUT APPARATUS AND VEHICLE WITH THE SAME

TECHNICAL FIELD

The present invention relates to a motive power output apparatus including at least two rotating electric machines as a source of motive power, and a vehicle with the same.

BACKGROUND ART

Japanese Patent Laying-Open No. 2004-328991 discloses a drive apparatus for a vehicle. This drive apparatus drives one of front wheels or rear wheels as main drive wheels by an engine or an electric motor, and drives driven wheels by an electric motor that does not have a permanent magnet.

According to this drive apparatus, since the electric motor of the driven wheels does not have a permanent magnet, cogging torque is not generated and friction is small when the electric motor idles without generating a drive force. Therefore, fuel efficiency of the vehicle is improved.

The above-described publication, however, does not disclose a specific configuration for a case where the main drive wheels are driven by the electric motor. In the publication, a system configuration best suited for a motive power output apparatus including a motor with a permanent magnet and a motor without a permanent magnet is not proposed.

DISCLOSURE OF THE INVENTION

Therefore, an object of the present invention is to provide a motive power output apparatus having a system configuration best suited for a motive power output apparatus including a motor with a permanent magnet and a motor without a permanent magnet.

Another object of the present invention is to provide a vehicle equipped with a motive power output apparatus having a system configuration best suited for a motive power output apparatus including a motor with a permanent magnet and a motor without a permanent magnet.

According to the present invention, a motive power output apparatus includes a power storage device, a boost device boosting a voltage from the power storage device, a first drive device receiving a voltage boosted by the boost device, a first rotating electric machine with a permanent magnet, driven by the first drive device, a second drive device receiving a voltage of the power storage device, and a second rotating electric machine without a permanent magnet, driven by the second drive device.

Preferably, the second rotating electric machine includes a reluctance motor.

Preferably, the second rotating electric machine includes an induction motor.

Preferably, a maximum power of the second rotating electric machine is smaller than a maximum power of the first rotating electric machine.

Preferably, the motive power output apparatus further includes a third drive device connected in parallel to the first drive device with respect to the boost device, and a third rotating electric machine with a permanent magnet, driven by the third drive device.

According to the present invention, a vehicle includes any of the above-described motive power output apparatuses, a main drive wheel linked to a first rotating electric machine of the motive power output apparatus, and a driven wheel linked to a second rotating electric machine of the motive power output apparatus.

According to the present invention, a vehicle includes any of the above-described motive power output apparatuses, a front wheel linked to one of first and second rotating electric machines of the motive power output apparatus, and a rear wheel linked to the other of the first and second rotating electric machines.

In the present invention, since the voltage of the power storage device is received by the second drive device driving the second rotating electric machine without a permanent magnet avoiding passage through the boost device, the boost ratio of the boost device is never increased higher than needed by the first rotating electric machine driven by the boosted voltage from the boost device.

Therefore, according to the present invention, an electric power loss in the boost device and the first drive device can be suppressed.

In addition, since energy is transmitted and received between the power storage device and the second drive device without passing through the boost device, the capacitance of components (a smoothing capacitor or the like) provided at the boost device and an output side (a high-voltage side) of the boost device can be reduced.

Furthermore, since the second rotating electric machine is configured as a rotating electric machine without a permanent magnet, unintended regeneration torque (deceleration torque) or regenerative electric power exceeding the possible storage capacity of the power storage device will not be generated even when the second drive device is connected to a low-voltage side (the power storage device) with respect to the boost device.

BEST MODES FOR CARRYING OUT THE INVENTION

Figure 1:
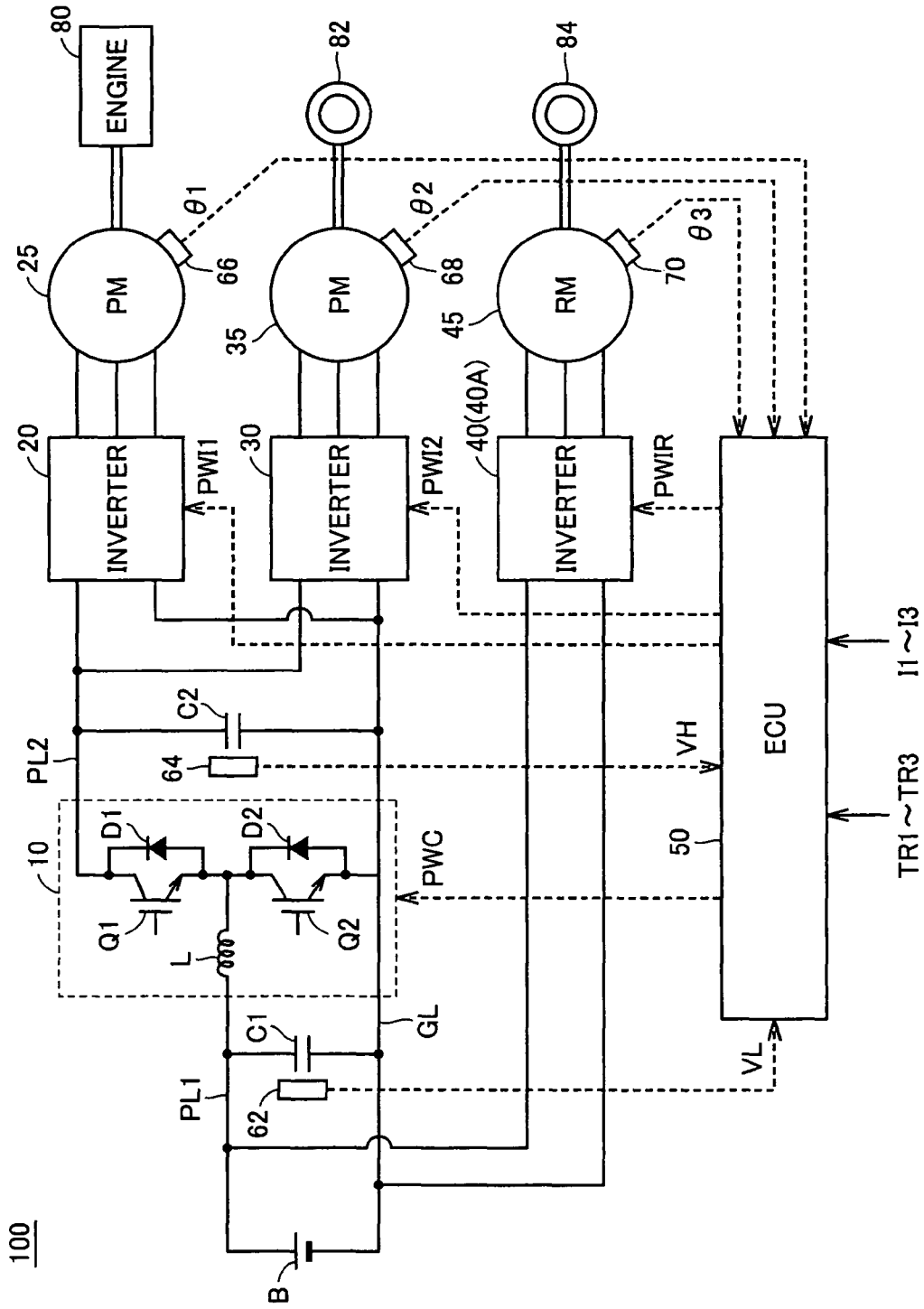
FIG. 1 is an overall block diagram of a hybrid vehicle represented as an example of a vehicle according to a first embodiment of the present invention.

The embodiments of the present invention will be described in detail below with reference to the drawings, in which the same or corresponding parts are represented by the same reference numerals, and the description thereof will not be repeated.

First Embodiment

FIG. 1 is an overall block diagram of a hybrid vehicle represented as an example of a vehicle according to a first embodiment of the present invention. Referring to FIG. 1, this hybrid vehicle 100 includes a power storage device B, a boost converter 10, inverters 20, 30 and 40, a generator 25, a front motor 35, a rear motor 45, an ECU (Electronic Control Unit) 50, an engine 80, front wheels 82, and rear wheels 84. Hybrid vehicle 100 further includes power supply lines PL1 and PL2, a ground line GL, capacitors C1 and C2, voltage sensors 62 and 64, and rotation angle sensors 66, 68 and 70.

Engine 80, front motor 35 and rear motor 45 are mounted on this hybrid vehicle 100 as a source of motive power. Front motor 35 has a rotation shaft mechanically coupled to a drive shaft of front wheels 82 and is incorporated into hybrid vehicle 100 as a motor for driving front wheels 82. Rear motor 45 has a rotation shaft mechanically coupled to a drive shaft of rear wheels 84 and is incorporated into hybrid vehicle 100 as a motor for driving rear wheels 84. Generator 25 has a rotation shaft mechanically coupled to a crank shaft of engine 80 and is incorporated into hybrid vehicle 100 as a generator operating mainly as a generator driven by engine 80 and also operating as a motor for starting engine 80.

Power storage device B is a chargeable and dischargeable direct current (DC) power supply and is formed of a secondary battery, for example a nickel-hydride battery, a lithium-ion battery or the like. Power storage device B outputs a DC voltage to power supply line PL1. Power storage device B receives DC electric power output from boost converter 10 to power supply line PL1 and is charged. It should be noted that a capacitor of large capacitance may be used as power storage device B.

Capacitor C1 smoothes the change in a voltage difference between power supply line PL1 and ground line GL. Voltage sensor 62 detects a voltage VL across capacitor C1 and outputs the detected value to ECU 50.

Boost converter 10 includes a reactor L, npn-type transistors Q1 and Q2, and diodes D1 and D2. Npn-type transistors Q1 and Q2 are connected in series between power supply line PL2 and ground line GL. Diodes D1 and D2 are connected in antiparallel to npn-type transistors Q1 and Q2, respectively. Reactor L has one end connected to power supply line PL1 and the other end connected to a connection node of npn-type transistors Q1 and Q2.

It should be noted that an IGBT (Insulated Gate Bipolar Transistor), for example, can be used as the npn-type transistors described above and npn-type transistors that will be described in the specification below. Furthermore, an electric power switching element such as a power MOSFET (metal oxide semiconductor field-effect transistor) can be used instead of the npn-type transistors.

Boost converter 10 boosts a voltage of power supply line PL1 and outputs the boosted voltage to power supply line PL2 based on a signal PWC from ECU 50. Specifically, boost converter 10 stores a current flowing when npn-type transistor Q2 is turned on in reactor L as magnetic field energy and emits the stored energy to power supply line PL2 through diode D1 when npn-type transistor Q2 is turned off, and thus boost converter 10 boosts a voltage of power supply line PL1.

Since electric power stored in reactor L is increased when the on-duty of npn-type transistor Q2 is increased, a higher-voltage output can be obtained. On the other hand, when the on-duty of npn-type transistor Q1 is increased, the voltage of power supply line PL2 is decreased. Thus, the duty ratios of npn-type transistors Q1 and Q2 are controlled, so that the voltage of power supply line PL2 can be controlled to a voltage of an arbitrary level that is not less than a voltage of power supply line PL1.

Capacitor C2 smoothes the change in a voltage difference between power supply line PL2 and ground line GL. Voltage sensor 64 detects a voltage VH across capacitor C2 and outputs the detected value to ECU 50.

Inverters 20 and 30 are provided corresponding to generator 25 and front motor 35, respectively. Inverter 20 converts the three-phase alternating current (AC) voltage that generator 25 generates by using an output of engine 80 into a DC voltage based on a signal PWI1 from ECU 50, and outputs the converted DC voltage to power supply line PL2. Inverter 20 also converts the DC voltage received from power supply line PL2 into a three-phase AC voltage based on signal PWI1 from ECU 50, and outputs the converted three-phase AC voltage to generator 25. Inverter 30 converts the DC voltage received from power supply line PL2 into a three-phase AC voltage based on a signal PWI2 from ECU 50, and outputs the converted three-phase AC voltage to front motor 35. Inverter 30 also converts the three-phase AC voltage generated by front motor 35 upon receiving the rotational force of front wheels 82 during regenerative braking of the vehicle into a DC voltage based on signal PWI2 from ECU 50, and outputs the converted DC voltage to power supply line PL2.

It should be noted that the regenerative braking herein includes braking with regenerative electric power generation that is caused when the driver driving the vehicle operates a foot brake, and deceleration of the vehicle (or discontinuation of acceleration thereof) with regenerative electric power generation that is caused by releasing the accelerator pedal, not operating the foot brake, while the vehicle is running.

Each of generator 25 and front motor 35 is formed of a permanent magnet-type three-phase AC synchronous motor (PM). Generator 25 generates a three-phase AC voltage by using an output of engine 80 and outputs the generated three-phase AC voltage to inverter 20. Generator 25 also generates a drive force by using the three-phase AC voltage received from inverter 20 and starts engine 80. Front motor 35 generates drive torque for the vehicle by using the three-phase AC voltage received from inverter 30. Front motor 35 also generates a three-phase AC voltage and outputs the generated voltage to inverter 30 during regenerative braking of the vehicle.

Inverter 40 is provided corresponding to rear motor 45. Inverter 40 is connected to power supply line PL1 and ground line GL. In other words, unlike inverters 20 and 30, inverter 40 is connected to power storage device B without interposing boost converter 10 therebetween. Inverter 40 converts the DC voltage from power storage device B into a three-phase AC voltage based on a signal PWIR from ECU 50, and outputs the converted three-phase AC voltage to rear motor 45.

Rear motor 45 is formed of a reluctance motor (RM) without a permanent magnet, and as a synchronous reluctance motor (SynR motor), for example. Rear motor 45 generates drive torque for the vehicle by using the three-phase AC voltage from inverter 40.

Rotation angle sensor 66 detects a rotation angle $\theta 1$ of a rotor of generator 25 and outputs the detected value to ECU 50. Rotation angle sensor 68 detects a rotation angle $\theta 2$ of a rotor of front motor 35 and outputs the detected value to ECU 50. Rotation angle sensor 70 detects a rotation angle $\theta 3$ of a rotor of rear motor 45 and outputs the detected value to ECU 50.

ECU 50 generates signal PWC for driving boost converter 10 based on a torque control value TR1 of generator 25, a torque control value TR2 of front motor 35, and voltages VL and VH from voltage sensors 62 and 64, and outputs generated signal PWC to boost converter 10. It should be noted that torque control values TR1 and TR2 are calculated in a hybrid ECU that is not shown based on an accelerator pedal position, vehicle speed or the like.

ECU 50 generates signal PWI1 for driving generator 25 based on torque control value TR1, voltage VH, a motor current I1 of generator 25, and rotation angle $\theta 1$ from rotation angle sensor 66, and outputs generated signal PWI1 to inverter 20. Furthermore, ECU 50 generates signal PWI2 for driving front motor 35 based on torque control value TR2, voltage VH, a motor current I2 of front motor 35, and rotation angle θ2 from rotation angle sensor 68, and outputs generated signal PWI2 to inverter 30. It should be noted that motor currents I1 and I2 are detected by a current sensor that is not shown.

ECU 50 generates signal PWIR for driving rear motor 45 based on a torque control value TR3 of rear motor 45, voltage VL, a motor current I3 of rear motor 45, and rotation angle θ3 from rotation angle sensor 70, and outputs generated signal PWIR to inverter 40. It should be noted that torque control value TR3 is calculated in the hybrid ECU based on a accelerator pedal position, vehicle speed or the like, and motor current I3 is detected by a current sensor that is not shown.

Figure 2:
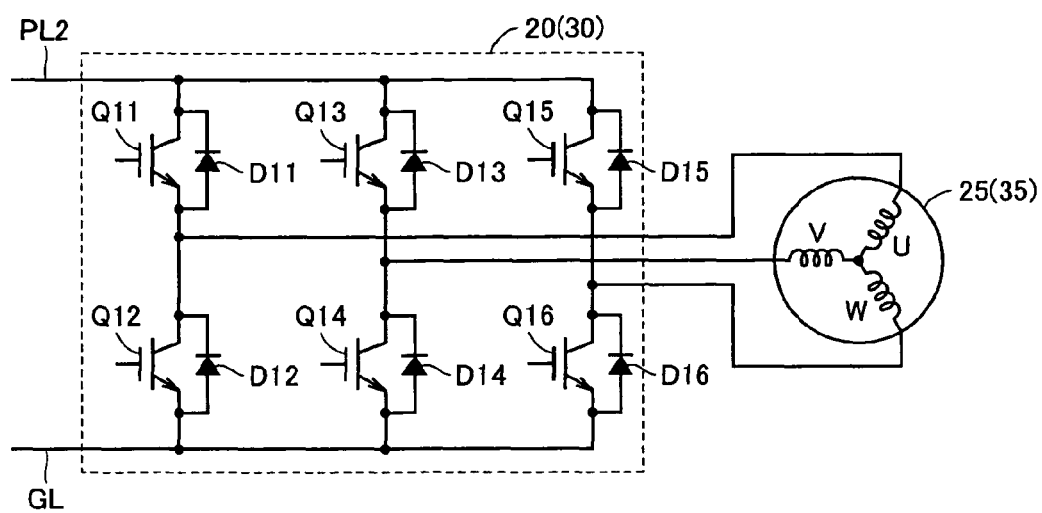
FIG. 2 is a circuit diagram of an inverter 20 or 30 in FIG. 1.

FIG. 2 is a circuit diagram of inverter 20 or 30 in FIG. 1. It should be noted that a circuit configuration of inverter 30 is the same as that of inverter 20 and the circuit configuration of inverter 20 will be typically described below. Referring to FIG. 2, inverter 20 includes npn-type transistors Q11-Q16 and diodes D11-D16.

Npn-type transistors Q11-Q16 and diodes D11-D16 form a three-phase bridge circuit. In other words, npn-type transistors Q11 and Q12 are connected in series between power supply line PL2 and ground line GL to form a U-phase arm. Npn-type transistors Q13 and Q14 are connected in series between power supply line PL2 and ground line GL to form a V-phase arm. Npn-type transistors Q15 and Q16 are connected in series between power supply line PL2 and ground line GL to form a W-phase arm. Diodes D11-D16 are connected in antiparallel to npn-type transistors Q11-Q16, respectively.

A connection node of npn-type transistors Q11 and Q12, a connection node of npn-type transistors Q13 and Q14, and a connection node of npn-type transistors Q15 and Q16 are connected to U, V and W-phase coils, respectively, of generator 25.

In this inverter 20 (30), npn-type transistors Q11-Q16 are switching-controlled based on signal PWI1 (PWI2) from ECU 50 that is not shown. As a result, electrical conduction of each of the U, V and W-phase coils of generator 25 (front motor 35) is controlled and generator 25 (front motor 35) is driven.

Figure 3:
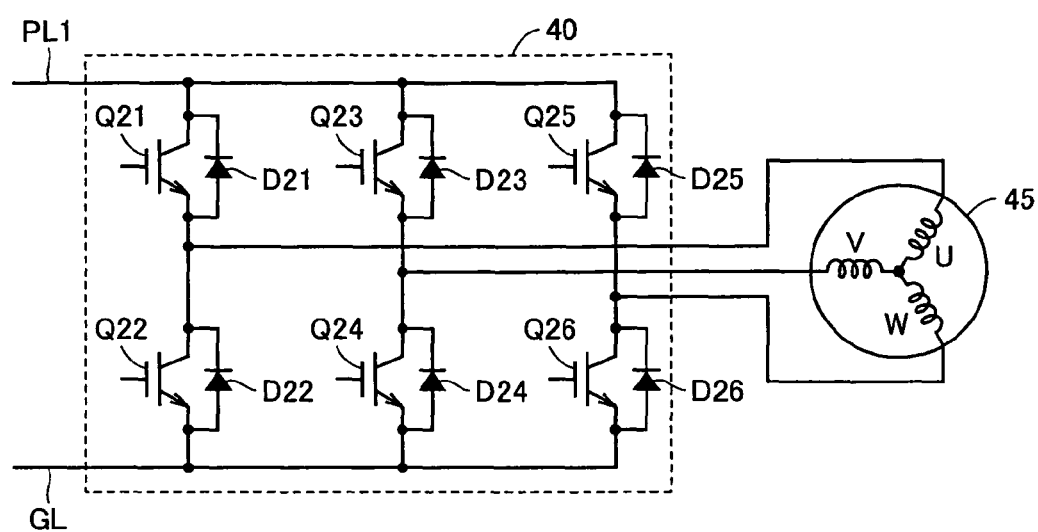
FIG. 3 is a circuit diagram of an inverter 40 in FIG. 1.

FIG. 3 is a circuit diagram of inverter 40 in FIG. 1. Referring to FIG. 3, inverter 40 includes npn-type transistors Q21-Q26 and diodes D21-D26. Npn-type transistors Q21-Q26 and diodes D21-D26 form a three-phase bridge circuit as in inverters 20 and 30. A connection node of npn-type transistors Q21 and Q22, a connection node of npn-type transistors Q23 and Q24, and a connection node of npn-type transistors Q25 and Q26 are connected to U, V and W-phase coils, respectively, of rear motor 45.

In this inverter 40, npn-type transistors Q21-Q26 are switching-controlled based on signal PWIR from ECU 50 that is not shown. As a result, electrical conduction of each of the U, V and W-phase coils of rear motor 45 is controlled in response to rotation angle θ3 of rear motor 45 and rear motor 45 is driven.

Referring again to FIG. 1, in this hybrid vehicle 100, each of generator 25 and front motor 35 is formed of a permanent magnet motor. Generator 25 mainly generates electric power by using an output of engine 80 and front motor 35 drives front wheels 82 as a main drive wheel. The voltage from power storage device B is boosted by boost converter 10. Inverters 20 and 30 receives the boosted voltage from boost converter 10 and drives generator 25 and front motor 35, respectively.

On the other hand, rear motor 45 is formed of a synchronous reluctance motor without a permanent magnet and drives rear wheels 84 as a driven wheel. Inverter 40 driving rear motor 45 is connected to power supply line PL1, not to power supply line PL2 in parallel to inverters 20 and 30 (in other words, inverter 40 is connected to power storage device B). Inverter 40 receives a voltage from power storage device B and drives rear motor 45.

The reason why a synchronous reluctance motor without a permanent magnet is employed as rear motor 45 will be described below. If inverter 40 driving rear motor 45 is connected to power supply line PL2 in parallel to inverters 20 and 30, the voltage required to drive rear motor 45 may exceed the voltage required to drive generator 25 and front motor 35 in some cases. In this case, only from the viewpoint of driving of generator 25 and front motor 35, the input voltage of inverters 20 and 30 (corresponding to the output voltage of boost converter 10) is unnecessarily high, and thus an electric power loss is unnecessarily increased in boost converter 10 and inverters 20 and 30.

On the other hand, since rear motor 45 driving rear wheels 84 as the driven wheel requires less power as compared to generator 25 and front motor 35 driving front wheels 82 as the main drive wheel, inverter 40 driving rear motor 45 can be connected to low-voltage power supply line PL1 and the voltage from power storage device B, not a boosted voltage from boost converter 10, can be used to drive rear motor 45. By such a configuration, the boost ratio of boost converter 10 can be suppressed, and therefore, a loss in boost converter 10 and inverters 20 and 30 can be suppressed. In addition, since electric power is supplied from power storage device B to inverter 40 without passing through boost converter 10 and capacitor C2, an electric power loss can be reduced and the capacitance of boost converter 10 and capacitor C2 can also be reduced.

When inverter 40 is connected to low-voltage power supply line PL1, however, the input voltage of inverter 40 becomes low. Therefore, the following problems arise if a permanent magnet motor is used as the rear motor similarly as generator 25 and front motor 35. That is, since the input voltage of inverter 40 is low, a back electromotive force of the rear motor easily exceeds the input voltage and the energy easily flows from the rear motor to power supply line PL1. As a result, unintended regeneration torque (deceleration torque) is generated when the rear motor rotates at high speed. Furthermore, since the storage capacity of power storage device B is limited, the amount of regenerative electric power from the rear motor will exceed the capacity of power storage device B if the rear motor continues to rotate at high speed.

Therefore, in the present first embodiment, in order to avoid the above-described problems caused when inverter 40 corresponding to rear motor 45 is connected to low-voltage power supply line PL1, a synchronous reluctance motor without a permanent magnet is used as rear motor 45 in addition to connecting inverter 40 to power supply line PL1.

Even when a synchronous reluctance motor without a permanent magnet is used as rear motor 45, rear motor 45 may generate regenerative electric power if negative torque control is provided. Unless such torque control is provided intentionally, however, rear motor 45 will not generate regenerative electric power.

Since rear motor 45 driving rear wheels 84 as the driven wheel requires less power as compared to front motor 35 driving front wheels 82 as the main drive wheel, a motor whose output is lower than that of front motor 35 can be used as rear motor 45.

[Modification]

Although a synchronous reluctance motor is used as rear motor 45 in the foregoing, a switched reluctance motor may be used as rear motor 45.

Figure 4:
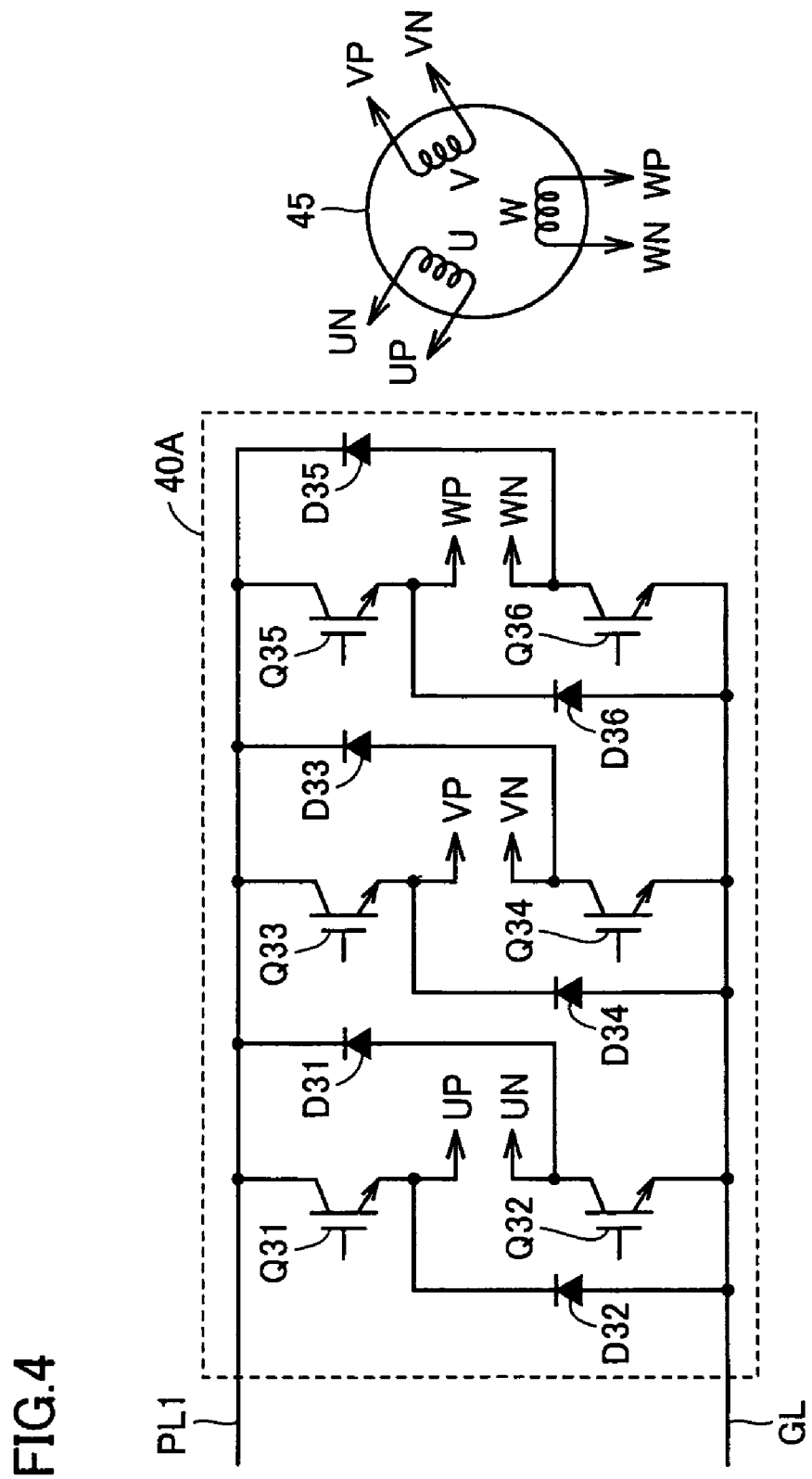
FIG. 4 is a circuit diagram of an inverter when a switched reluctance motor is used as a rear motor.

FIG. 4 is a circuit diagram of an inverter when a switched reluctance motor is used as a rear motor. Referring to FIG. 4, an inverter 40A driving rear motor 45 that is formed of a switched reluctance motor includes npn-type transistors Q31-Q36 and diodes D31-D36.

Npn-type transistor Q31 has a collector terminal and an emitter terminal connected to power supply line PL1 and one end UP of the U-phase coil of rear motor 45, respectively. Npn-type transistor Q32 has a collector terminal and an emitter terminal connected to the other end UN of the U-phase coil and ground line GL, respectively.

Similarly, npn-type transistor Q33 has a collector terminal and an emitter terminal connected to power supply line PL1 and one end VP of the V-phase coil of rear motor 45, respectively. Npn-type transistor Q34 has a collector terminal and an emitter terminal connected to the other end VN of the V-phase coil and ground line GL, respectively. Npn-type transistor Q35 has a collector terminal and an emitter terminal connected to power supply line PL1 and one end WP of the W-phase coil of rear motor 45, respectively. Npn-type transistor Q36 has a collector terminal and an emitter terminal connected to the other end WN of the W-phase coil and ground line GL, respectively.

Diode D31 has an anode and a cathode connected to terminal UN and power supply line PL1, respectively, and diode D32 has an anode and a cathode connected to ground line GL and terminal UP, respectively. Diode D33 has an anode and a cathode connected to terminal VN and power supply line PL1, respectively, and diode D34 has an anode and a cathode connected to ground line GL and terminal VP, respectively. Diode D35 has an anode and a cathode connected to terminal WN and power supply line PL1, respectively, and diode D36 has an anode and a cathode connected to ground line GL and terminal WP, respectively.

In this inverter 40A, npn-type transistors Q31-Q36 are switching-controlled based on signal PWIR from ECU 50 that is not shown. As a result, electrical conduction of each of the U, V and W-phase coils wound around a salient pole of a stator is controlled in response to rotation angle θ3 of rear motor 45 and rear motor 45 is driven.

As described above, in the present first embodiment and a modification thereof, inverter 40 (40A) driving rear motor 45 without a permanent magnet is connected to power supply line PL1 (in other words, power storage device B) without interposing boost converter 10 therebetween, and thus the boost ratio of boost converter 10 dose not need to be increased higher than needed by generator 25 and front motor 35 driven by a boosted voltage from boost converter 10. Therefore, according to the present first embodiment, an electric power loss in boost converter 10 and inverters 20 and 30 can be suppressed.

In addition, since energy is transmitted and received between power storage device B and inverter 40 (40A) without passing through boost converter 10, the capacitance of boost converter 10, capacitor C2 or the like can be reduced.

Furthermore, since rear motor 45 is formed of a reluctance motor without a permanent magnet, unintended regeneration torque (deceleration torque) or regenerative electric power exceeding the possible storage capacity of power storage device B will not be generated even when inverter 40 (40A) driving rear motor 45 is connected to low-voltage power supply line PL1 (in other words, power storage device B).

Second Embodiment

Figure 5:
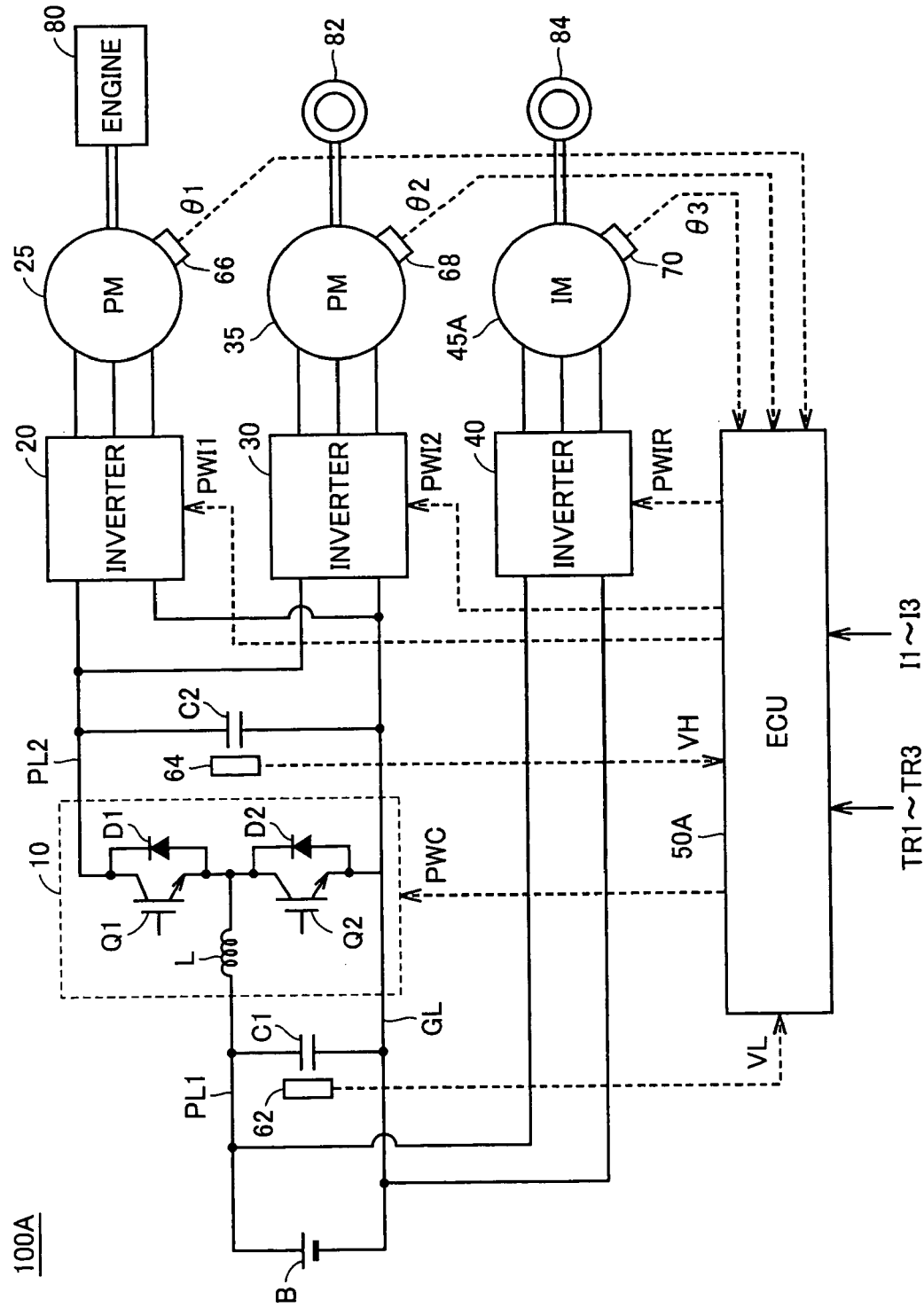
FIG. 5 is an overall block diagram of a hybrid vehicle represented as an example of a vehicle according to a second embodiment of the present invention.

FIG. 5 is an overall block diagram of a hybrid vehicle represented as an example of a vehicle according to a second embodiment of the present invention. Referring to FIG. 4, a hybrid vehicle 100A includes a rear motor 45A and an ECU 50A instead of rear motor 45 and ECU 50, respectively, in the configuration of hybrid vehicle 100 according to the first embodiment in FIG. 1.

Rear motor 45A is formed of an induction motor (IM). In other words, rear motor 45A does not have a permanent magnet. ECU 50A generates signal PWIR for driving rear motor 45A based on torque control value TR3 of rear motor 45A, voltage VL, motor current I3 of rear motor 45A, and rotation angle θ3 from rotation angle sensor 70, and outputs generated signal PWIR to inverter 40A.

It should be noted that the other configuration of ECU 50A is the same as that of ECU 50 in the first embodiment. The other configuration of hybrid vehicle 100A is also the same as that of hybrid vehicle 100 according to the first embodiment.

In this hybrid vehicle 100A, rear motor 45A is formed of an induction motor without a permanent magnet and drives rear wheels 84 as the driven wheel. Inverter 40 driving rear motor 45A is connected to power supply line PL1 (in other words, power storage device B) and receives a voltage from power storage device B to drive rear motor 45A.

As described above, according to the present second embodiment, inverter 40 is connected to power supply line PL1 and rear motor 45A is formed of an induction motor without a permanent magnet. Thus, the effect similar to that of the first embodiment can be obtained.

Third Embodiment

Figure 6:
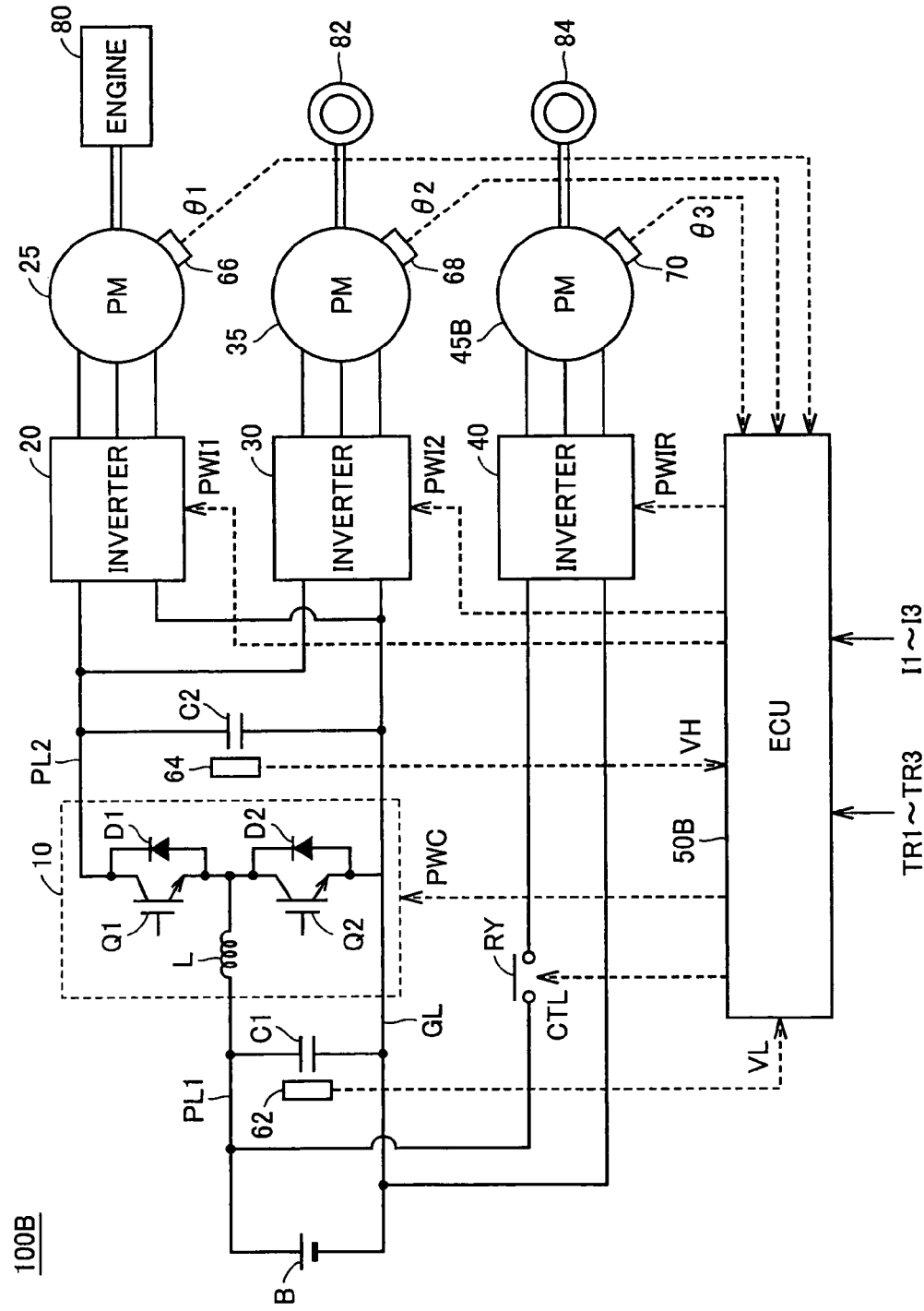
FIG. 6 is an overall block diagram of a hybrid vehicle represented as an example of a vehicle according to a third embodiment of the present invention.

FIG. 6 is an overall block diagram of a hybrid vehicle represented as an example of a vehicle according to a third embodiment of the present invention. Referring to FIG. 6, a hybrid vehicle 100B includes a rear motor 45B and an ECU 50B instead of rear motor 45 and ECU 50, respectively, in the configuration of hybrid vehicle 100 according to the first embodiment in FIG. 1. Hybrid vehicle 100B further includes a relay RY.

Rear motor 45B is formed of a permanent magnet-type synchronous motor (PM). In other words, rear motor 45B has a permanent magnet at a rotor and rear motor 45B generates a back electromotive force when the rotor rotates.

Relay RY is provided on an electric power line connecting inverter 40 to power supply line PL1. Relay RY electrically connects inverter 40 to power supply line PL1 when a signal CTL from ECU 50B is rendered active, and electrically disconnects inverter 40 from power supply line PL1 when signal CTL is rendered inactive.

ECU 50B generates signal PWIR for driving rear motor 45B based on torque control value TR3 of rear motor 45B, voltage VL from voltage sensor 62, motor current I3 of rear motor 45B, and rotation angle θ3 from rotation angle sensor 70, and outputs generated signal PWIR to inverter 40.

ECU 50B calculates a rotational speed of rear motor 45B based on rotation angle θ3 from rotation angle sensor 70. When the calculated rotational speed of rear motor 45B exceeds a preset reference rotational speed, ECU 50B outputs a shutdown command (a command for ordering a stop of switching of inverter 40) to inverter 40 and renders signal CTL output to relay RY inactive.

The above-described reference rotational speed is determined based on a rotational speed when a back electromotive force of rear motor 45B may exceed the voltage of power storage device B (in other words, a rotational speed when regenerative electric power flows from rear motor 45B to power storage device B while inverter 40 is being shut down).

It should be noted that the remaining configuration of ECU 50B is the same as that of ECU 50 in the first embodiment. The remaining configuration of hybrid vehicle 100B is also the same as that of hybrid vehicle 100 according to the first embodiment.

In this hybrid vehicle 100B, inverter 40 driving rear motor 45B is connected to low-voltage power supply line PL1 and rear motor 45B is formed of a permanent magnet motor. Since regenerative electric power is constantly supplied from rear motor 45B to power storage device B when rear motor 45B rotates at high speed, the problems described in connection with the first embodiment may arise. In comparison, in the present third embodiment, such problems do not arise because inverter 40 is electrically disconnected from power supply line PL1 (in other words, power storage device B) by relay RY when the rotational speed of rear motor 45B exceeds a reference rotational speed.

When the rotational speed of rear motor 45B exceeds a reference rotational speed, a field-weakening current flow can be conducted through rear motor 45B to suppress the back electromotive force of rear motor 45B. Efficiency is, however, decreased by that amount of the current. Therefore, in the present third embodiment, relay RY is provided to electrically disconnect rear motor 45B from power storage device B.

As described above, in the present third embodiment, inverter 40 driving rear motor 45B is connected to power supply line PL1 (in other words, power storage device B) without interposing boost converter 10 therebetween. Rear motor 45B is formed of a permanent magnet motor, and regenerative electric power may flow constantly from rear motor 45B to power storage device B when rear motor 45B rotates at high speed. However, the above-described problems are avoided because relay RY electrically disconnecting inverter 40 from power storage device B when rear motor 45B rotates at high speed is provided.

Therefore, according to the present third embodiment, even when inverter 40 driving rear motor 45B is connected to low-voltage power supply line PL1 (in other words, power storage device B) and a permanent magnet motor is used as rear motor 45B, generation of unintended regeneration torque (deceleration torque) and regenerative electric power exceeding the possible storage capacity of power storage device B can be avoided.

Although front wheels 82 and rear wheels 84 correspond to the main drive wheel and the driven wheel, respectively, in each embodiment described above, rear wheels 84 and front wheels 82 may correspond to the main drive wheel and the driven wheel, respectively, and front motor 35 and rear motor 45 (or 45A, 45B) may be linked to rear wheels 84 and front wheels 82, respectively.

In addition, although hybrid vehicles 100, 100A and 100B are formed of a series type in which engine 80 is only used to drive generator 25 and electric power generated by generator 25 is used to generate a drive force for the vehicle at front motor 35 and rear motors 45, 45A and 45B in the foregoing, the present invention is also applicable to a series/parallel-type hybrid vehicle in which a power split device can split motive power of engine 80 so that the split motive power is transmitted to a drive shaft of the vehicle and generator 25.

Furthermore, although a secondary battery is used as power storage device B in the foregoing, a fuel cell may be used. Although a hybrid vehicle is described as an example of a vehicle according to the present invention in the foregoing, a vehicle according to the present invention also includes a fuel cell vehicle and an electric vehicle where engine 80 is not mounted as a source of motive power.

In the foregoing, boost converter 10 corresponds to "a boost device" in the present invention. Inverter 30 corresponds to "a first drive device" in the present invention, and front motor 35 corresponds to "a first rotating electric machine" in the present invention. Furthermore, inverters 40 and 40A correspond to "a second drive device" in the present invention, and rear motors 45 and 45A correspond to "a second rotating electric machine" in the present invention. Moreover, inverter 20 corresponds to "a third drive device" in the present invention, and generator 25 corresponds to "a third rotating electric machine" in the present invention.

It should be understood that the embodiments disclosed herein are illustrative and not limitative in any respect. The scope of the present invention is defined by the terms of the claims, rather than the description of the embodiments above, and is intended to include any modifications within the scope and meaning equivalent to the terms of the claims.

The invention claimed is:

1. A motive power output apparatus comprising:
    a power storage device;
    a boost device boosting a voltage from said power storage device;
    a first drive device receiving a voltage boosted by said boost device;
    a first rotating electric machine with a permanent magnet, driven by said first drive device;
    a second drive device directly connected to said power storage device; and
    a second rotating electric machine without a permanent magnet, driven by said second drive device,
    wherein the boost device applies a voltage to the first drive device and not to the second drive device.

2. The motive power output apparatus according to claim 1, wherein said second rotating electric machine includes a reluctance motor.

3. A vehicle comprising:
    a motive power output apparatus according to claim 2;
    a main drive wheel linked to a first rotating electric machine of said motive power output apparatus; and
    a driven wheel linked to a second rotating electric machine of said motive power output apparatus.

4. A vehicle comprising:
    a motive power output apparatus according to claim 2;
    a front wheel linked to one of first and second rotating electric machines of said motive power output apparatus; and
    a rear wheel linked to the other of said first and second rotating electric machines.

5. The motive power output apparatus according to claim 1, wherein said second rotating electric machine includes an induction motor.

6. A vehicle comprising:
    a motive power output apparatus according to claim 5;
    a main drive wheel linked to a first rotating electric machine of said motive power output apparatus; and
    a driven wheel linked to a second rotating electric machine of said motive power output apparatus.

7. A vehicle comprising:
    a motive power output apparatus according to claim 5;
    a front wheel linked to one of first and second rotating electric machines of said motive power output apparatus; and a rear wheel linked to the other of said first and second rotating electric machines.

8. The motive power output apparatus according to claim 1, wherein a maximum power of said second rotating electric machine is smaller than a maximum power of said first rotating electric machine.

9. A vehicle comprising:
a motive power output apparatus according to claim 8;
a main drive wheel linked to a first rotating electric machine of said motive power output apparatus; and
a driven wheel linked to a second rotating electric machine of said motive power output apparatus.

10. A vehicle comprising:
a motive power output apparatus according to claim 8;
a front wheel linked to one of first and second rotating electric machines of said motive power output apparatus; and
a rear wheel linked to the other of said first and second rotating electric machines.

11. The motive power output apparatus according to claim 1, further comprising:
a third drive device connected in parallel to said first drive device with respect to said boost device; and
a third rotating electric machine with a permanent magnet, driven by said third drive device.

12. A vehicle comprising:
a motive power output apparatus according to claim 11;
a main drive wheel linked to a first rotating electric machine of said motive power output apparatus; and
a driven wheel linked to a second rotating electric machine of said motive power output apparatus.

13. A vehicle comprising:
a motive power output apparatus according to claim 11;
a front wheel linked to one of first and second rotating electric machines of said motive power output apparatus; and
a rear wheel linked to the other of said first and second rotating electric machines.

14. A vehicle comprising:
a motive power output apparatus according to claim 1;
a main drive wheel linked to a first rotating electric machine of said motive power output apparatus; and
a driven wheel linked to a second rotating electric machine of said motive power output apparatus.

15. A vehicle comprising:
a motive power output apparatus according to claim 1;
a front wheel linked to one of first and second rotating electric machines of said motive power output apparatus; and
a rear wheel linked to the other of said first and second rotating electric machines.

* * * * *